United States Patent
Cipolla

(10) Patent No.: US 11,951,709 B1
(45) Date of Patent: Apr. 9, 2024

(54) CANISTER AND METHOD OF PRODUCTION

(71) Applicant: Steven A Cipolla, Warwick, RI (US)

(72) Inventor: Steven A Cipolla, Warwick, RI (US)

(73) Assignee: National Chain Company, Warwick, RI (US)

( * ) Notice: Subject to any disclaimer, the term of this patent is extended or adjusted under 35 U.S.C. 154(b) by 128 days.

(21) Appl. No.: 17/356,865

(22) Filed: Jun. 24, 2021

Related U.S. Application Data

(63) Continuation-in-part of application No. 16/940,584, filed on Jul. 28, 2020, now Pat. No. 11,260,467.

(60) Provisional application No. 62/880,811, filed on Jul. 31, 2019, provisional application No. 62/880,339, filed on Jul. 30, 2019.

(51) Int. Cl.

| | |
|---|---|
| *B32B 15/01* | (2006.01) |
| *B32B 1/02* | (2006.01) |
| *B32B 1/08* | (2006.01) |
| *B32B 15/04* | (2006.01) |
| *B65D 65/40* | (2006.01) |
| *C22C 1/051* | (2023.01) |
| *C22C 26/00* | (2006.01) |
| *C22C 29/02* | (2006.01) |

(52) U.S. Cl.
CPC ............... *B32B 15/01* (2013.01); *B32B 1/02* (2013.01); *B32B 1/08* (2013.01); *B32B 15/043* (2013.01); *B32B 2250/02* (2013.01); *C22C 1/051* (2013.01); *C22C 26/00* (2013.01); *C22C 29/02* (2013.01)

(58) Field of Classification Search
CPC .. B65D 1/18; B65D 65/40; B65D 1/16; B32B 2439/02; B32B 15/01; B32B 1/08; B32B 1/02; B32B 2250/02; B32B 15/043; B23K 20/00; B23K 20/04; C22C 1/051; C22C 26/00; C22C 29/02
See application file for complete search history.

(56) References Cited

U.S. PATENT DOCUMENTS 2,894,321 A 7/1959 Dubilier
2013/0112565 A1 5/2013 Filson

*Primary Examiner* — Yan Lan
(74) *Attorney, Agent, or Firm* — Salter & Michaelson

(57) ABSTRACT

A metal canister that is used in the fabrication of an item, the metal canister comprised of a first metal layer, and a second metal layer that is clad to the first metal layer so as to form a sheet stock, wherein the first metal layer comprises Tantalum and the second metal layer comprises Niobium or Molybdenum. The first metal layer of Tantalum is on an inner surface of the canister when formed. The canister can be comprised of more Niobium (or Molybdenum) than Tantalum, more Tantalum than Niobium (or Molybdenum), or approximately equal amounts of each of the Niobium (or Molybdenum) and Tantalum. The sheet stock can be clad together by mechanical bonding under high pressure of at least 1,000,000 psi. Prior to cladding, the materials can be subject to a brushing to deoxidize the materials.

13 Claims, 7 Drawing Sheets

CANISTER AND METHOD OF PRODUCTION

RELATED CASES

Priority for this application is hereby claimed under 35 U.S.C. § 119(e) to U.S. patent application Ser. No. 16/940,584 filed Jul. 28, 2020, which claims priority to commonly owned and U.S. Provisional Patent Application Nos. 62/880,339 filed on Jul. 30, 2019 and 62/880,811 which was filed on Jul. 31, 2019, and each of which is incorporated by reference herein in its entirety.

FIELD OF THE INVENTION

The present invention relates in general to an improved product that combines two different materials in order to produce a more affordable product. The product of the present invention also relates to an improved method for providing this product.

SUMMARY OF THE INVENTION

The present invention enables the bonding of two alloys into a single sheet stock by rolling layers of these materials under pressure in order to bond the two layers together. The bonded layers form a sheet stock that can be formed into a canister. The two materials that are mechanically bonded include a first metal material comprising tantalum and a second material comprising at least one of niobium, molybdenum, or steel.

A metal canister that is used in the fabrication of an item, the metal canister comprised of a first metal layer, and a second metal layer that is clad to the first metal layer so as to form a sheet stock, wherein the first metal layer comprises Tantalum and the second metal layer comprises Niobium or Molybdenum.

In the metal canister, the sheet stock can be comprised of at least 30% Tantalum. The sheet stock can be comprised of at least 0.1-99.9% Tantalum. The sheet stock can be comprised of at least 95% Niobium. The sheet stock can be comprised of at least 30% tantalum. In the canister, the thickness of the second metal layer has a ratio relative to the thickness of the first metal layer which is at least on the order of 2/1. In the canister, the thickness of the second metal layer can have a ratio relative to the thickness of the first metal layer which is at least on the order of 3/1. In the canister, the thickness of the second metal layer can have a ratio relative to the thickness of the first metal layer which is at least on the order of 4/1.

A canister that is used in the fabrication of an item, is comprised of a first metal layer; and a second metal layer that is clad to the first metal layer so as to form a sheet stock, wherein the sheet stock is formed into a canister form, wherein the first metal layer comprises a tantalum layer and the second metal layer comprises a niobium or Molybdenum layer, wherein the canister, when formed, has the tantalum layer as an inner layer and the niobium layer as an outer layer of the canister.

In the canister, the sheet stock can be comprised of at least 51% Niobium. In the canister, the sheet stock can be comprised of at least 51% Molybdenum. In the canister, the sheet stock can be comprised of approximately equal amounts of the first metal layer and the second metal layer.

A sheet stock of material comprised of a first metal material, and a second metal material, that is clad to the first metal layer so as to form a sheet stock, wherein the sheet stock is formed into a canister form, wherein the first metal layer comprises a tantalum layer and the second metal layer comprises a Niobium or Molybdenum layer.

The sheet stock can be comprised of at least 30% Tantalum. The sheet stock can be comprised of at least 10-60% Tantalum. The sheet stock can be comprised of more Niobium or Molybdenum than Tantalum. In the sheet stock, the material is comprised of at least 50% Tantalum. The sheet stock can be formed into a canister, and the canister can have a body that is cylindrical, square, or star in shape. In the canister, the inner layer can comprise Tantalum.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION

Figure 1:
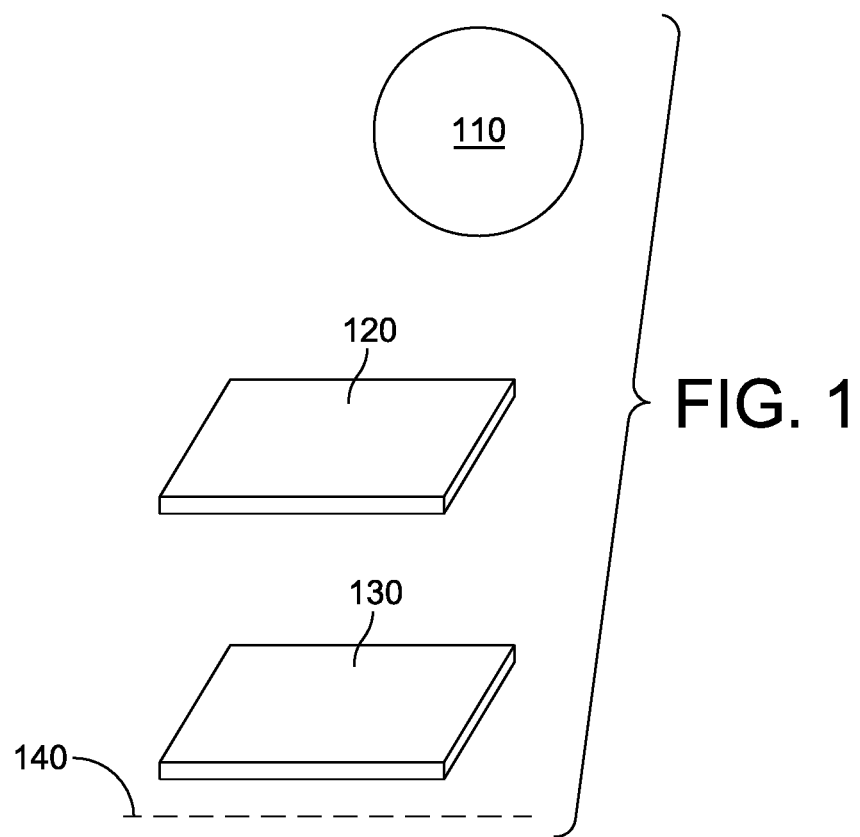
FIG. 1 is an exploded view illustrating a first step in the process.

In accordance with the present invention as illustrated in FIGS. 1-4, there is provided a bonding of two alloys together into a sheet stock 200. These two alloys are a first material 120 which, for example, can be tantalum and a second metal material which, for example, can be niobium, molybdenum, or steel. These materials are to be rolled together under pressure to mechanically bond the two layers together to form the sheet stock 200. In FIG. 1 the layers are illustrated as in exploded view with the first metal material 120 and the second metal material 130 with the pressure applied being indicated by the roller 110. The roller can press the two layers 120, 130 together against a surface 140, which may be a flat surface, a second roller, or another structure as appropriate to form the canisters in according with the present disclosure.

Figure 2:
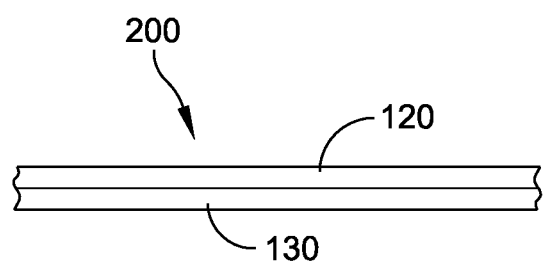
FIG. 2 is an illustration of the produced sheet stock.
Figure 2A:
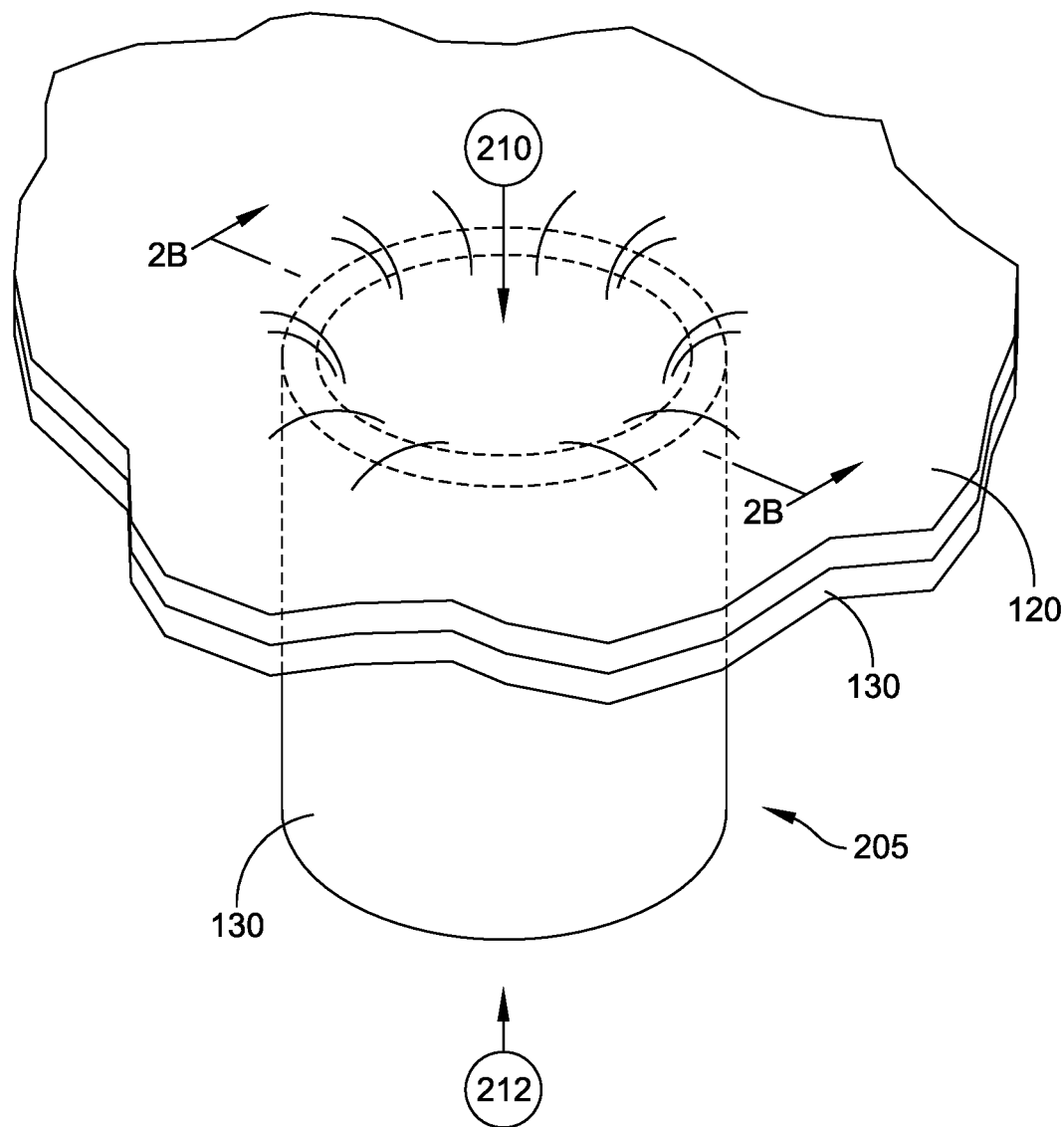
FIG. 2A illustrates the sheet stock formed into the final canister product.
Figure 2B:
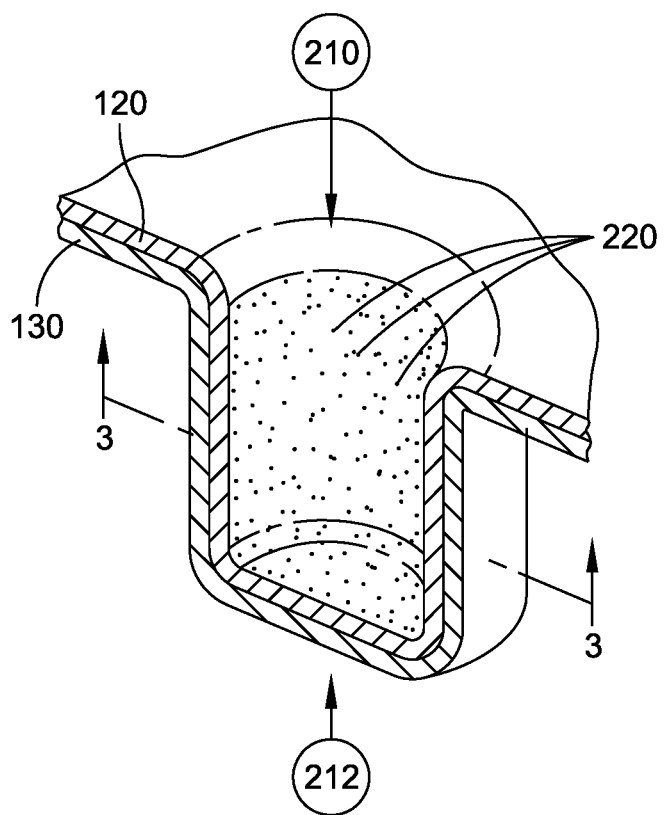
FIG. 2B illustrates a cross-sectional view as taken across lines 2B-2B of FIG. 2A.
Figure 3:
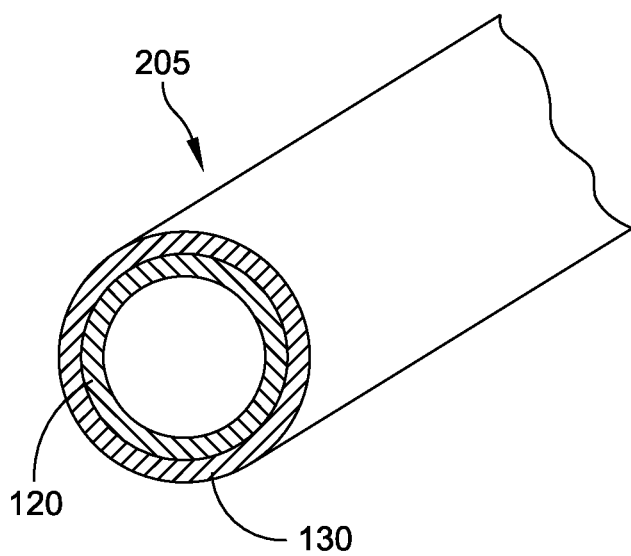
FIG. 3 illustrates a cross-sectional view of the final canister product as taken along line 3-3 of FIG. 2B.

Reference may now be made to the fragmentary cross-sectional view of FIG. 2 that shows these two layers 120 and 130 as formed into the sheet stock 200. The sheet stock is then formed by means of a deep draw stamp into canister 205 as illustrated in FIG. 2A-FIG. 3. These canisters 205 may be used in the diamond fabrication industry. It will be appreciated that the two layers 120 and 130 can be formed into the sheet stock 200, and then at a later time, or in a subsequent processing step, can be formed into the canister as shown in FIG. 2A. The two layers 120 and 130 can, instead of being formed into the sheet stock and then into the canister in two separate steps, can be formed into the canister simultaneously at the same time that the layers are mechanically bonded together, using an appropriate roller 110 and rolling surface 140 to achieve the desired canister shape. For example, the rolling surface 140 can be a cup having the same shape as the canister, such that when a roller presses the metal layers downward into the cup, the canister forms the shape of the cup. The excess material surrounding the top of the canister 205, for example as shown in FIGS. 2A and 2B, can be removed to reveal the canister only that can be used in forming the diamond part. In other embodiments, the excess material can remain for the PDC drill forming portion.

It is known in the art prior to the present application that canisters are made only of niobium as this is a less expensive material than tantalum, however it is less robust and niobium alone can often penetrate through to the underlying diamond tool. On the contrary, a purely tantalum canister does not risk the penetration that can occur from niobium; however tantalum is very expensive. The anti-leakage properties of the tantalum indicate there are advantages to providing a layer of tantalum. Thus in accordance with the present invention a cladding of the two layers is formed where the benefit of both materials can be taken advantage of, with the less expensive niobium forming part of the canister structure that is able to withstand the high melting point (3000° F. or more) but that has the tantalum material in proximity to the diamond tool so that any leakage is prevented or at least reduced as much as possible. This clad material provides a better performing canister with the inside surface formed of tantalum and the outside surface formed of the less expensive niobium. This clad together material provides the polycrystalline diamond canister a better performing product at an affordable price.

The amount of tantalum material as compared to the amount of the second metal material is variable within ordinary skill, depending upon the particular application. For example, some applications may be require a thicker or greater amount of the first material as compared to the second material, or vice versa some applications may require a thicker or greater amount of the second material as compared to the first material. The sheet stock in one example can be comprised of 30% tantalum, or any value in the range of 0.1-99.9% Tantalum, including the range of 10-60% tantalum. The sheet stock can be 50% of each material. The first metal material and the second metal material should have a purity of at least 99.9% to ensure proper mechanical bonding of the materials during the bonding process.

In one embodiment the thickness of the outer layer 130 has a ratio relative to the thickness of the inner layer 120 which may be on the order of 2/1 or, more particularly, the ratio may be on the order of 3/1 or even more particularly, the ratio may be on the order of 4/1.

In accordance with the present invention there is thus provided a mechanical bonding between the layers 120 and 130. This is formed into a single sheet stock shown at 200 in FIG. 2. The percentages of each of the layers can be varied as well as the respective thicknesses. As has been indicated, this clad strip is used in the production of deep drawn and stamped parts; refer to FIG. 3. These parts may be used in particular for applications in the PCD diamond industry.

In an embodiment of the present invention instead of providing the niobium layer as layer 130 there are other materials that can be used to form a canister in the same manner. For example, both molybdenum and steel may be used along with the tantalum layer. Thus, in one embodiment the respective layers shown in FIG. 2 would be tantalum and molybdenum and in the second embodiment, it would be tantalum and steel. In both embodiments the tantalum forms the inner layer regarding the formation of the canister. Other metal alloys other than niobium, molybdenum, or steel, may be used, to achieve the desired outcome according to the present disclosure.

In accordance with the PCD diamond industry, the canister is used to form a PDC drill bit within the canister. This can be accomplished by adding diamond powder to the interior of the canister (as indicated by the particles 220 shown in FIG. 2B). Thereafter, carbide (for example, cemented carbide) is added to the canister, and a PCD drill bit is thus formed by the interaction of the diamond particles with the carbide. The tantalum on the interior surface of the canister provides the necessary interface such that the PCD diamond can be formed within the canister. The canister can thereafter be removed to reveal the PCD drill bit. If one were to use pure Niobium, this can result in cracks or delamination in the diamond. The use of Tantalum prevents these cracks or delamination, but it is significantly more expensive than Niobium. Thus, a canister with Tantalum on the inside surface to interact with the diamond powder and the Niobium (or Molybdenum) on the exterior surface provides a cost-effective solution.

Figure 3A:
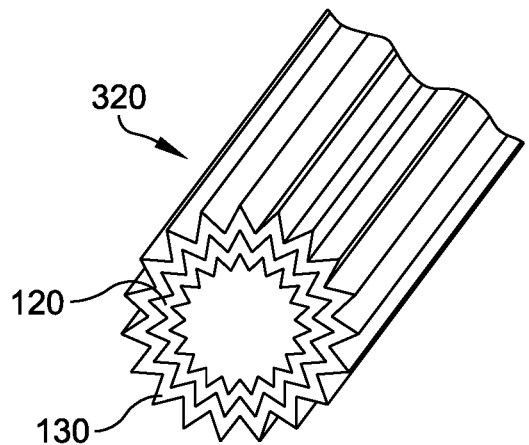
FIG. 3A illustrates an alternate cross-sectional shape for the final canister, with the shape being a multi-sided star.

FIG. 3A illustrates an alternate cross-sectional shape for the final canister, with the canister 320 being a multi-sided star. In this configuration, the first metal material 120 is still on an interior of the canister 320 and the second metal material 130 is on an exterior of the canister 320.

Figure 3B:
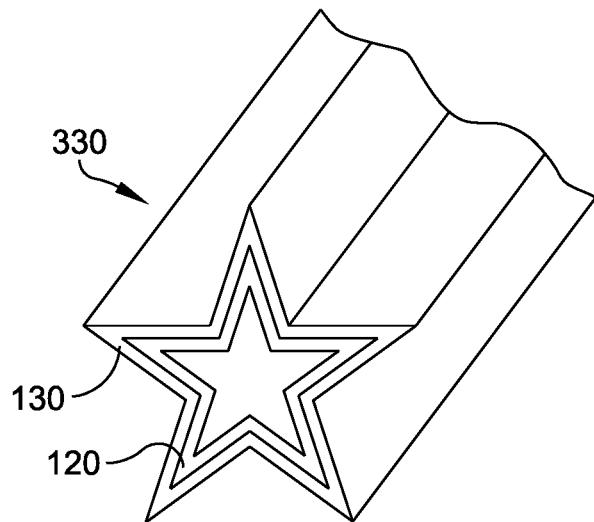
FIG. 3B illustrates another alternate cross-sectional shape for the final canister, with the shape being a regular 5-sided star.

FIG. 3B illustrates another alternate cross-sectional shape for the final canister, with the canister 330 being a regular 5-sided star. In this configuration, the first metal material 120 is still on an interior of the canister 330 and the second metal material 130 is on an exterior of the canister 330.

Figure 3C:
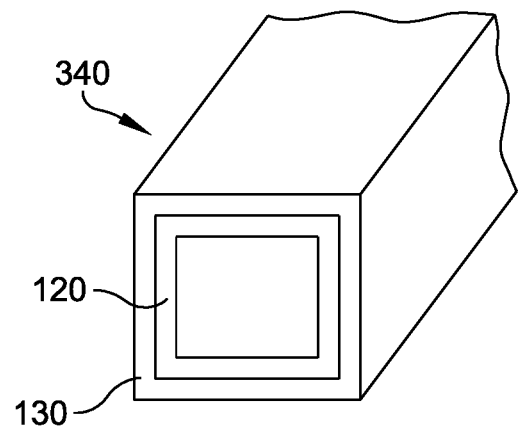
FIG. 3C illustrates still another alternate cross-sectional shape for the final canister, with the shape being square.

FIG. 3C illustrates still another alternate cross-sectional shape for the final canister, with the canister 340 being square in shape. In this configuration, the first metal material 120 is still on an interior of the canister 340 and the second metal material 130 is on an exterior of the canister 340.

It should be appreciated that the square- and star-shaped canisters are only example shapes, and other shapes and configurations can be implemented within ordinary skill to achieve the desired shape for the resulting PCD tool that will be formed within the canister.

Figure 4:
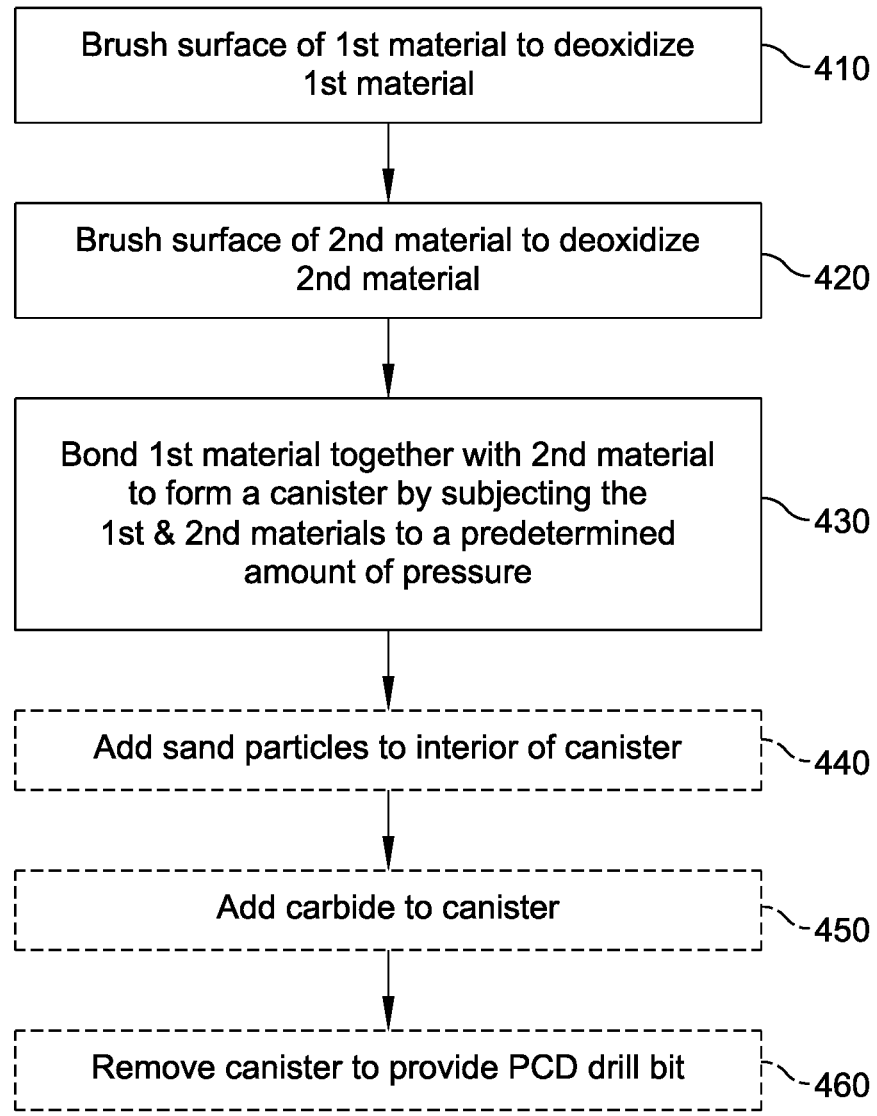
FIG. 4 illustrates a flow chart of a method of forming a canister according to the present disclosure.

FIG. 4 illustrates a flow chart of a method of forming a canister according to the present disclosure. At block 410, the surface of the first material is brushed (e.g., with a metal brush) to deoxidize the first material. At block 420, the surface of the second material is brushed (e.g., with a metal brush) to deoxidize the second material. The brushing is not required to achieve the canister of the present disclosure, however it achieves a superior product to deoxidize the metal materials.

At block 430, the first material is clad or otherwise mechanically bonded to the second material to form a canister. The canister can have any shape as will be appreciated in light of the present disclosure, including but not limited to the canister shown in FIG. 2A, FIG. 2B, FIG. 3, FIG. 3A, FIG. 3B, or FIG. 3C. This can be accomplished by a roller pressing the first material and the second material together against a rolling surface under a predetermined amount of pressure, such as a pressure of at least 1,000,000 psi. This canister can be used to form a PCD drill bit according to the subsequent block 440, 450, and 460. It will be appreciated that bonding the first material and the second material together can be accomplished simultaneously with forming the stack into a canister, or the materials can be bonded into a sheet stock together by a first mechanical bonding, and then the sheet stock can be subsequently formed into a canister in a second processing step.

At block 440, diamond particles can be added to the interior of the canister, for example as shown in FIG. 2B with particles 220 on the interior of the canister 205. The diamond particles are deposited on the interior tantalum layer in this embodiment. This provides a canister that is able to withstand the high melting point during the bonding process, that affords a layer of tantalum that is sufficient such that leakage of the PCD into the canister material does not occur.

At block 450, carbide is then added to the interior of the canister. The diamond particles and the carbide interact to form a PCD drill bit. The canister can then be removed at block 460 to reveal the PCD drill bit having the shape of the interior of the canister. The canister can have an interior diameter generally of 13-19 millimeters (mm). In some cases, the canister can have an interior diameter of approximately 2½ inches or more.

In a conventional PDC (polycrystalline diamond compact) cutter manufacturing process diamond powder and cemented carbide substrate are enclosed in niobium crucibles surrounded by sodium chloride, placed inside a graphite resistance heater, and enclosed a pyrophyllite cube. The samples are first subjected to a pressure around 8 GPa and the temperature is raised to approximately 1400° C. for sintering diamond by passing electric current. The samples are maintained at approximately 1400° C. for approximately 2 minutes. Power is then turned off and the cell is cooled before pressure is released. Once sintered, the samples are removed from the cube assembly. During this high temperature high pressure process sometimes niobium crucible interacts with diamond and causes cracks or delamination in the diamond table if the process requires higher sintering temperature especially for sintering fine grain diamond. These cracks or delamination in the diamond table can be prevented by using tantalum crucible because tantalum can withstand much higher temperature with no interaction with diamond due to its higher melting point. However, tantalum is significantly more expensive than niobium.

The designed and patented tantalum cladded niobium crucible to take the benefit of higher melting point of tantalum while keeping the cost low. Tantalum cladding is done inside the niobium crucible.

The following table showed that the melting point of tantalum is more than 500° C. higher than the melting point of niobium. Higher melting point allows higher sintering temperature especially with fine grain diamond without causing cracking or delamination in the diamond table. The Coefficient of linear Thermal Expansion (CTE) values are close and hence, cladding remains intact at higher temperature. Similar thermal conductivity and electrical resistivity values in both materials ensure no change in process parameters. Similar crystal structure ensures similar ductility in both metals.

TABLE 1

Physical Property comparison between niobium and tantalum

| | Niobium | Tantalum |
|---|---|---|
| Melting Point | 2477° C. | 3017° C. |
| CTE @ 0° C.-100° C. | $7.1 \times 10^{-6}$/° C. | $6.3 \times 10^{-6}$/° C. |
| Thermal Conductivity @ 20° C. | 53.7 [W/(m·K)] | 57.5 [W/(m·K)] |
| Electrical Resistivity @ 20° C. | 152.0 nΩ·m | 135.0 nΩ·m |

In one example configuration the completed product can have an approximate thickness of 0.0057" niobium and 0.0039" tantalum. In another example configuration the completed product can have an approximate thickness of 0.0056" niobium and 0.0039" tantalum.

Figure 5:
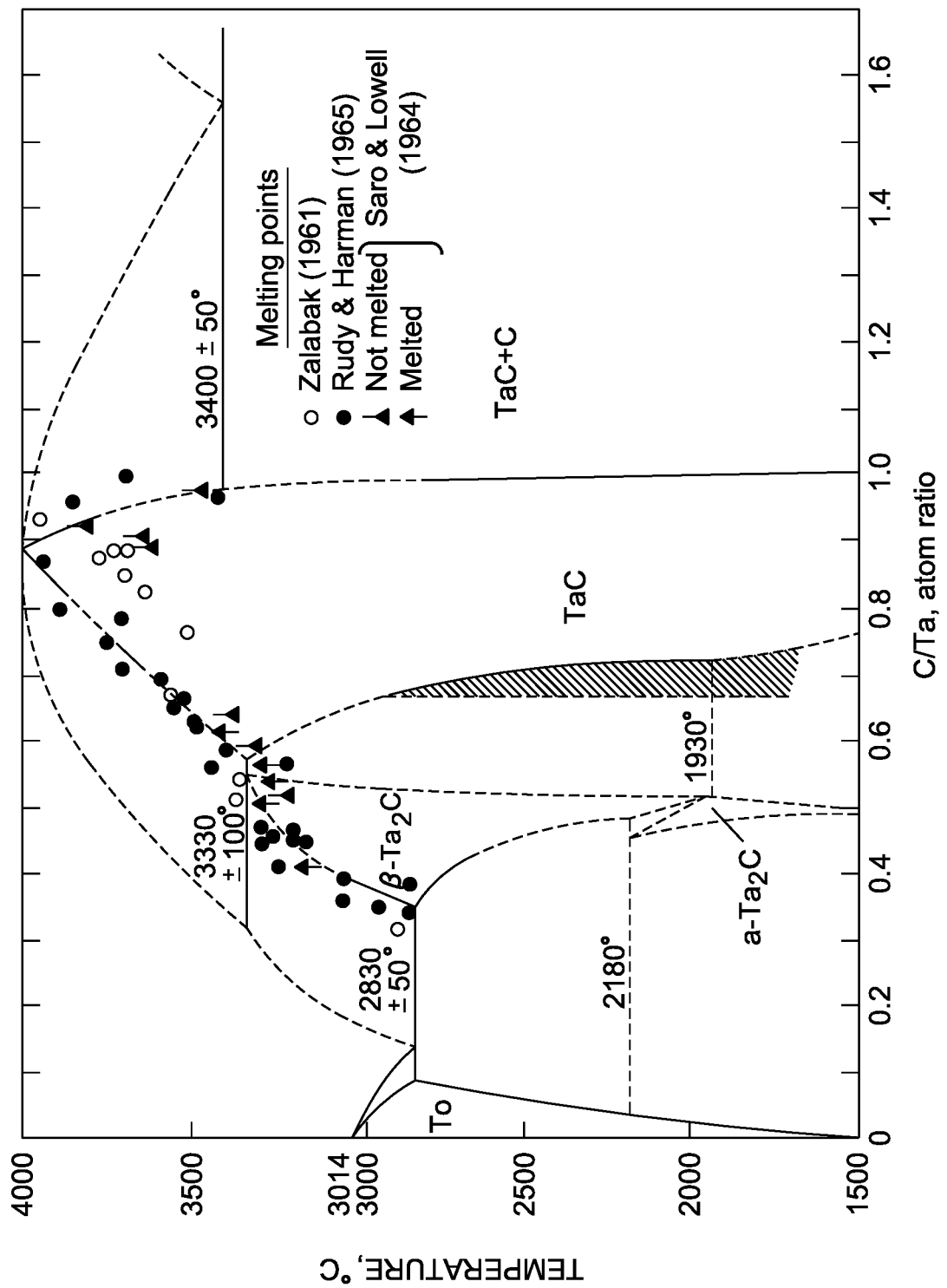
FIG. 5 is a graphical diagram illustrating a phase diagram of Tantalum-Carbon (Ta—C) of the atom ratio of C/Ta as a function of temperature, in degrees Celsius.
Figure 6:
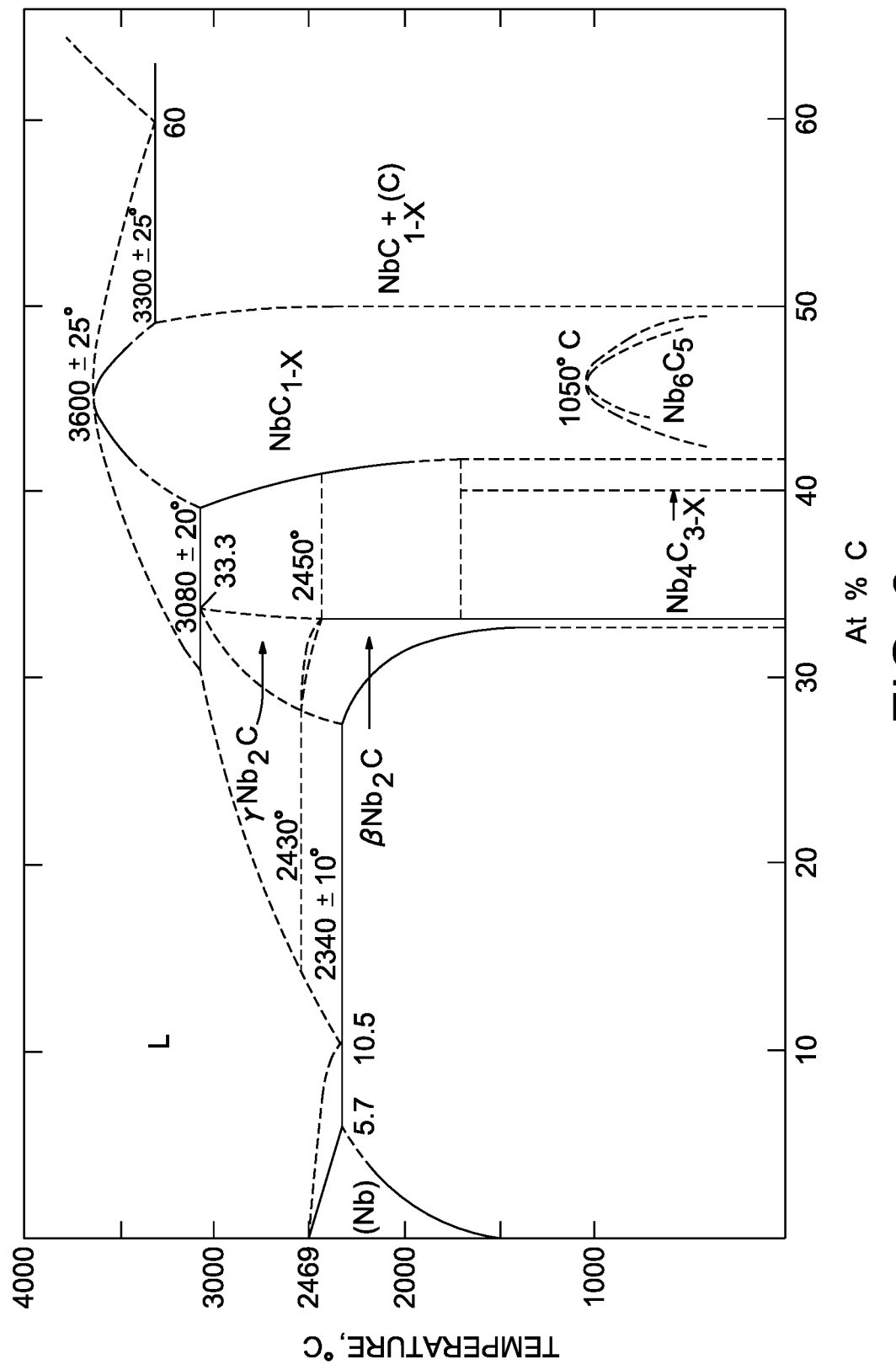
FIG. 6 is a graphical diagram illustrating a phase diagram of Niobium-Carbon (Nb—C) of the value at percentage of Carbon as a function of temperature, in degrees Celsius.

FIG. 5 is a graphical diagram illustrating a phase diagram of Tantalum-Carbon (Ta—C) of the atom ratio of C/Ta as a function of temperature, in degrees Celsius. In comparison, FIG. 6 is a graphical diagram illustrating a phase diagram of Niobium-Carbon (Nb—C) of the value at percentage of Carbon as a function of temperature, in degrees Celsius. As shown in the graphs, the higher eutectic temperature of the Ta—C system better than Nb—C system; and higher melting point of Ta than Nb. Note that the eutectic temperature if 2830° C. in the Ta—C system of FIG. 5 at Tantalum rich side, and the Tantalum melting point is 3017° C. In comparison, the eutectic temperature is 2340° C. in the Nb—C system of FIG. 6 at Niobium rich side, and the Niobium melting point is 2477° C. Utilizing Tantalum is preferred due to the Tantalum having a higher eutectic temperature in the Ta—C system as compared to the Nb—C system. Also, the Tantalum having a higher melting point than Niobium makes it preferred to the Niobium.

Having now described a limited number of embodiments of the present invention, it should now be apparent to those skilled in the art that numerous other embodiments and modifications thereof are contemplated as falling within the scope of the present invention, as defined by the appended claims.

The invention claimed is:

1. A canister structure that is used in the PCD diamond industry for the purpose of forming a PCD drill bit within the canister structure, the canister structure comprised of a cup shaped structure that includes a cylindrical sidewall, and integral therewith, a base; diamond particles and carbide being disposed within the cup shaped structure in order to form the final PCD drill bit; throughout the cup shaped structure constructing the cup shaped structure by mechanical bonding of respective metal layers that are comprised of a first metal layer and a second metal layer to form a sheet stock, the sheet stock being formed into the cup shaped canister construction, wherein the first metal layer comprises tantalum and the second metal layer comprises niobium, molybdenum, or steel; wherein the tantalum layer is an inner layer of the cup shaped structure and the second layer is an outer layer of the cup shaped structure and wherein the canister consists of only the respective first and second metal layers.

2. The canister structure of claim 1 wherein the mechanical bonding is by cladding together the first and second metal layers.

3. The canister structure of claim 1 wherein the mechanical bonding is by including a roller to clad the first and second metal layers at a pressure of at least 1,000,000 psi.

4. The canister structure of claim 1 wherein the first and second metal layers are of equal thickness.

5. The canister structure of claim 1 wherein the forming of the cup shaped canister from the sheet stock is simultaneous with the respective metal layers being mechanically bonded together.

6. The canister structure of claim 5 wherein the mechanical bonding is by cladding together the first and second metal layers.

7. The canister structure of claim 5 wherein the mechanical bonding is by including a roller to clad the first and second metal layers at a pressure of at least 1,000,000 psi.

8. The canister structure of claim 5 wherein the first and second metal layers are of equal thickness.

9. The canister structure of claim 1 wherein the cylindrical sidewall of the cup shaped structure is a continuous cylindrical sidewall.

10. The canister structure of claim 9 wherein the base of the cup shaped structure is planar and is integral with the cylindrical sidewall.

11. The canister structure of claim 5 wherein the cylindrical sidewall of the cup shaped structure is a continuous cylindrical sidewall.

12. The canister structure of claim 11 wherein the base of the cup shaped structure is planar and is integral with the cylindrical sidewall.

13. The canister structure of claim 1 wherein the tantalum layer defines an inner exposed surface of the canister, and the second layer defines an outer exposed surface of the canister.

* * * * *